(12) United States Patent
Cheshire

(10) Patent No.: US 8,949,304 B2
(45) Date of Patent: Feb. 3, 2015

(54) METHOD AND APPARATUS FOR ACCELERATING THE EXPIRATION OF RESOURCE RECORDS IN A LOCAL CACHE

(75) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2248 days.

(21) Appl. No.: 10/676,572

(22) Filed: Sep. 30, 2003

(65) Prior Publication Data
US 2005/0044355 A1 Feb. 24, 2005

Related U.S. Application Data

(60) Provisional application No. 60/496,843, filed on Aug. 20, 2003.

(51) Int. Cl.
G06F 15/16 (2006.01)
G06F 17/30 (2006.01)
H04L 29/08 (2006.01)

(52) U.S. Cl.
CPC ........ *G06F 17/3048* (2013.01); *H04L 67/2852* (2013.01); *H04L 69/329* (2013.01)
USPC .......................................... 709/201; 709/203

(58) Field of Classification Search
USPC ......... 709/213–214, 217, 219, 203, 220–228; 707/10
See application file for complete search history.

(56) References Cited

U.S. PATENT DOCUMENTS

| | | | |
|---|---|---|---|
| 4,661,902 A | 4/1987 | Hochsprung et al. | 364/200 |
| 4,689,786 A | 8/1987 | Sidhu et al. | 370/94 |
| 5,150,464 A | 9/1992 | Sidhu et al. | 395/200 |
| 5,222,242 A * | 6/1993 | Choi et al. | 709/227 |
| 5,282,270 A | 1/1994 | Oppenheimer et al. | 395/200 |
| 5,388,213 A | 2/1995 | Oppenheimer et al. | 395/200 |
| 5,745,699 A | 4/1998 | Lynn et al. | 395/200 |
| 5,884,322 A | 3/1999 | Sidhu et al. | 707/200 |
| 6,021,429 A * | 2/2000 | Danknick | 709/208 |
| 6,321,263 B1 * | 11/2001 | Luzzi et al. | 709/224 |
| 6,496,859 B2 * | 12/2002 | Roy et al. | 709/223 |
| 6,574,197 B1 * | 6/2003 | Kanamaru et al. | 370/252 |
| 6,834,302 B1 * | 12/2004 | Harvell | 709/224 |
| 7,006,836 B2 * | 2/2006 | Yokoyama | 455/456.1 |

(Continued)

OTHER PUBLICATIONS

Stuart Cheshire, Marc Krochman: "Multicas DNS" Internet Draft, Jan. 29, 2003 pp. 1-43, XP002306128. Retreived from the Internet: URL:http://www.cs-ipv6.1ancs.ac.uk/ipv6/documents/standards/general-comms/internet-drafts/draft-cheshire-dnsext-multicastdns-03.txt> retrieved on Nov. 16, 2004 Item 6. abstract.

*Primary Examiner* — Minh-Chau Nguyen
(74) *Attorney, Agent, or Firm* — Park, Vaughan, Fleming & Dowler LLP

(57) ABSTRACT

One embodiment of the present invention provides a system that facilitates reconfirmation of resource records in a cache. The system starts by retrieving the resource record at a client and attempting to establish communication using the data in that resource record. In the event that communication is not successful, the system responds by issuing one or more queries for the resource record in question. The system then waits for a response to the query. If the response to the query is not received in a predetermined amount of time, the system invalidates the resource record. The response from the device is a multicast response, thereby allowing other clients to update corresponding resource records in their local caches without querying the device, and thus saving network bandwidth.

21 Claims, 3 Drawing Sheets

(56) References Cited

U.S. PATENT DOCUMENTS

| | | |
|---|---|---|
| 7,085,763 B2 * | 8/2006 | Ochiai et al. ............... 707/10 |
| 7,117,201 B2 * | 10/2006 | Kuno et al. ............... 707/3 |
| 7,117,264 B2 * | 10/2006 | Becker et al. ............... 709/227 |
| 7,143,108 B1 * | 11/2006 | George ............... 1/1 |
| 7,164,885 B2 * | 1/2007 | Jonsson et al. ............... 455/41.2 |
| 7,167,762 B2 * | 1/2007 | Glanzer et al. ............... 700/79 |
| 7,194,552 B1 * | 3/2007 | Schneider ............... 709/245 |
| 7,209,736 B2 * | 4/2007 | Link et al. ............... 455/419 |
| 7,336,668 B2 * | 2/2008 | Adams ............... 370/396 |
| 2002/0107982 A1 | 8/2002 | Teodosiu et al. ............... 709/245 |
| 2003/0026410 A1 * | 2/2003 | Lumsden ............... 379/221.01 |
| 2003/0050955 A1 * | 3/2003 | Eatough et al. ............... 709/201 |
| 2003/0055817 A1 | 3/2003 | Yoshimura et al. ............... 707/3 |
| 2005/0007628 A1 * | 1/2005 | Yamano et al. ............... 358/1.15 |
| 2006/0221863 A1 * | 10/2006 | Ishimoto et al. ............... 370/254 |

* cited by examiner

METHOD AND APPARATUS FOR ACCELERATING THE EXPIRATION OF RESOURCE RECORDS IN A LOCAL CACHE

RELATED APPLICATION

This application hereby claims priority under 35 U.S.C. §119 to U.S. Provisional Patent Application No. 60/496,843, filed on 20 Aug. 2003, entitled "Method and Apparatus for Accelerating the Expiration of Resource Records in a Local Cache," by inventor Stuart D. Cheshire.

BACKGROUND

1. Field of the Invention

The present invention relates to computer networks. More specifically, the present invention relates to a method and an apparatus accelerating the expiration of local resource records in a local cache.

2. Related Art

The explosive growth of broadband technology and network infrastructure, coupled with continually decreasing prices, has led to an increasing number of computer networks in homes and small businesses. Along with this small-office/home-office network revolution comes the daunting task of configuring and administering these networks. Plug-and-play network protocols, such as Apple Computer Inc.'s Rendezvous, have been developed to simplify administration tasks. Within Rendezvous, devices, such as printers, scanners, and network attached storage, automatically configure themselves and advertise their services upon being connected to the network. Computer systems on the network add resource records for these devices to their local cache upon receiving the advertisement, thus maintaining a list of available services on the network.

Along with the benefits of maintaining a local cache come problems. Computer systems on the network must continually update their cache records to maintain an accurate list of available services. Traditionally, computer systems have done this by querying the services and waiting for a response. If a response is not received within a specified amount of time, or after a specified amount of tries, the record pertaining to the service or associated device is deleted from the cache. Frequently polling services (and related devices) in this way provides a more accurate list of services, but can dramatically increase network traffic.

One problem with caching resource records arises from stale data. A device may be removed from the network in a manner that does not allow it to report the unavailability of its services. Power failures, improper shutdowns, and disconnected network cables are just a few examples of common occurrences that can cause invalid cache records. Often, users unsuccessfully try to use a service because a corresponding locally cached record for the service is invalid, which causes the service incorrectly to show up locally as being available. This can result in frustration to the user because the service still shows up as available in the local list. Moreover, even if some cache records are invalidated on some computer systems, the same invalid cache records may still be present on other computer systems on the network.

Hence, what is needed is a method and an apparatus for maintaining resource records in a cache without the limitations listed above.

SUMMARY

One embodiment of the present invention provides a system that facilitates validating a resource record in a cache. The system starts by retrieving the resource record at a client and attempting to use this information to establish communication with the corresponding service. If the attempt to establish communication is unsuccessful, then this suggests that the data in the resource record may be incorrect, so a query for that resource record is issued on the network. If a response is received containing different resource record data, then the cache is updated with the new data, and the attempt to establish communication is repeated using the new information. If, after sending the query one, two, three, or more, times, as appropriate, no response is received, then this indicates that the resource record is no longer valid, and it is deleted from the cache. In this way the stale data is deleted more promptly that it would be if the decision were made solely based on the time-to-live originally attached to that data.

When the record is deleted from the cache, this technique may then be applied recursively to call into question any records that refer to the now-deleted record. To take an example from the domain name system, if the now-deleted record were an address record, then any other records (e.g. SRV, PTR, CNAME, etc.) containing the name of this address record on their right-hand side are similarly suspect, and should be similarly updated or deleted as appropriate. In the case of Apple's Rendezvous, the response from the device is a multicast response, thereby allowing other clients to update corresponding resource records in their local caches without querying the device, and thus saving network bandwidth.

In a variation on this embodiment, prior to invalidating the resource record, the system issues a second query for the resource record and waits for a response to the second query from the device. If the response to the second query is not received in a pre-determined amount of time, the system invalidates the resource record.

In a variation on this embodiment, the system receives a message from a second client querying for a second resource record. Upon receiving the query, the system locates a second resource record and waits for a multicast response to the multicast message. If the multicast response to the multicast message is not received in the pre-determined amount of time, the system invalidates the second resource record.

In a variation on this embodiment, invalidating the resource record also involves invalidating a child record of the resource record.

In a variation on this embodiment, if the response to the query is not received in a pre-determined amount of time, the system retrieves a parent record of the resource record at the client and multicasts a query for the parent record. The system then waits for a response to the query from the device, and if the response to the query is not received in a pre-determined amount of time, the system invalidates the parent record.

In a variation on this embodiment, if the response to the query is not received in a pre-determined amount of time, the system retrieves a parent record of the resource record at the client and multicasts a query for the parent record. The system then receives a response to the query from the device, and updates the resource record with the information included in the response.

In a further variation, the system updates the parent record with the information received in the response.

In a variation on this embodiment, the system is invoked to validate resource records in the cache at a pre-specified time interval.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Network

Figure 1:
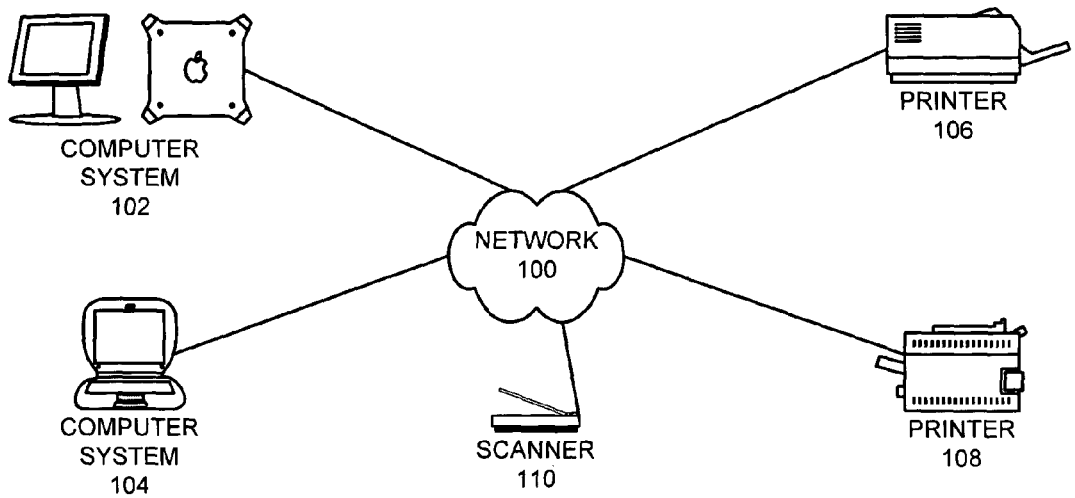
FIG. 1 illustrates a computer network in accordance with an embodiment of the present invention.

FIG. 1 illustrates a computer network 100 in accordance with an embodiment of the present invention. Network 100 can generally include any type of wired or wireless communication channel capable of coupling together computing nodes. This includes, but is not limited to, a local area network, a wide area network, or a combination of networks. In one embodiment of the present invention, network 100 includes the Internet.

Network 100 includes computer systems 102 and 104, printers 106 and 108, and scanner 110. Computer systems 102 and 104 can generally include any type of computer system, including, but not limited to, a computer system based on a microprocessor, a mainframe computer, a digital signal processor, a portable computing device, a personal organizer, a device controller, and a computational engine within an appliance.

In one embodiment of the present invention, the devices on network 100 adhere to a plug-and-play protocol, such as Apple Computer, Inc.'s Rendezvous technology. Printers 106 and 108, and scanner 110 self-configure to network 100 and advertise their services via multicast messages to all nodes on network 100. Computer systems 102 and 104 each utilize a local cache that contains resource records for the known devices and services on network 100.

Cached Resource Records

Figure 2:
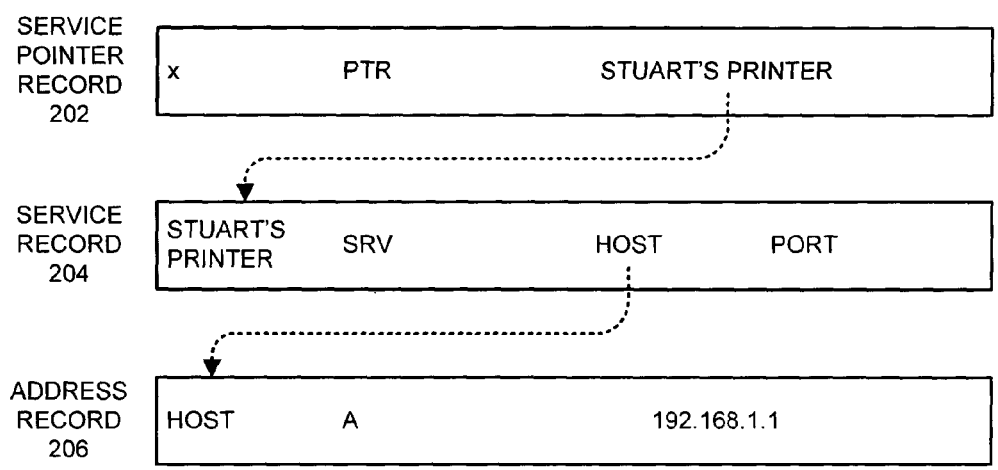
FIG. 2 illustrates cached resource records in accordance with an embodiment of the present invention.

FIG. 2 illustrates cached resource records in accordance with an embodiment of the present invention. Each device on network 100, such as printer 106, may have a several resource records containing information pertaining to that device, such as service pointer record 202, in the cache on computer systems in network 100. Service pointer record 202 includes the type of service and the name of the service instance. In the example shown in FIG. 2, service pointer record 202 identifies a printing service named "Stuart's Printer."

Each service pointer record 202 refers by name to a corresponding service record 204, which contains information about a service on the device named in service record 204. Note that one device may offer multiple services, and thus may have multiple service records. Service record 204 contains the name of the device that the service is provided by. In the example shown in FIG. 2, service record 204 contains the name of corresponding address record 206, which contains the Internet Protocol (IP) address for the service.

Validating Resource Records in a Local Cache

Figure 3:
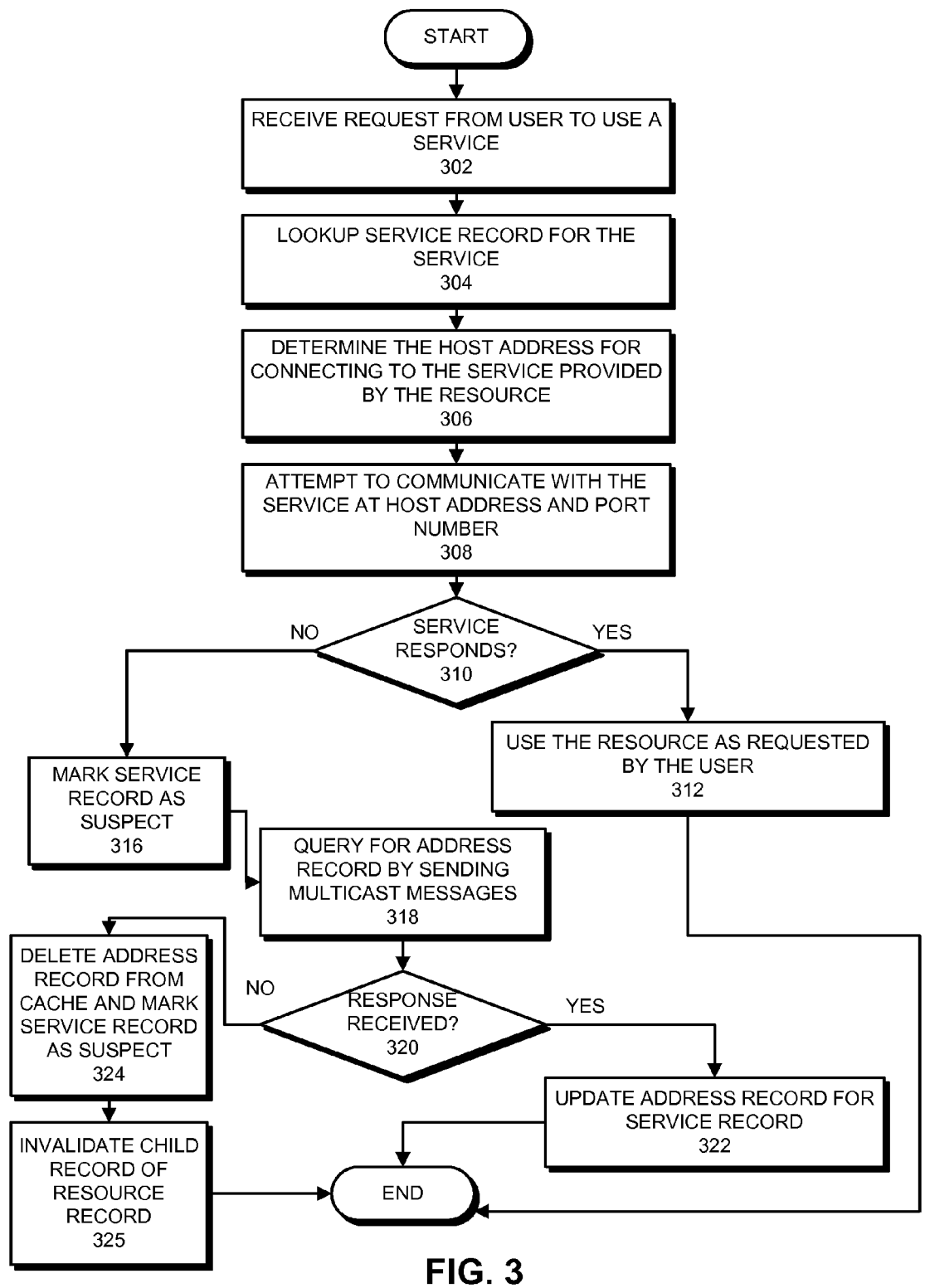
FIG. 3 presents a flowchart illustrating the process of updating a resource record in a cache in accordance with an embodiment of the present invention.

FIG. 3 presents a flowchart illustrating the process of updating or invalidating resource records in a local cache in accordance with an embodiment of the present invention. The system starts when a request is received from a user to use a service on network 100 (step 302). Upon receiving the request, the system looks up the service record 204 for the device (step 304).

Next, the system determines the host address for connecting to the service provided by the resource (step 306). This is accomplished by looking up address record 206 that is referenced by service record 204. Once the host address and port number are known, the system attempts to communicate with the service at the host and port number (step 308). If the communication is successful, the system uses the resource as requested by the user (step 312).

If the communication is not successful, the system marks address record 206 as suspect (step 316). The system then queries for the address record by sending one or more multicast messages to the entire network (step 318), and waiting for a response (step 320). If the service responds, the system updates address record 206 with information included in the response and uses the service as directed by the user (step 322). If no response is received after a specified amount of time and a specified amount of queries, the address record is deleted from the cache and the system marks service record 204 as suspect (step 324). The system then invalidates any child record of the service record (step 325).

At this point, the process repeats and the system sends queries for the service record 204 by sending a multicast message to the entire network, and waiting for a response. If no response is received then service record 204 is deleted from the cache, and the system proceeds to reconfirm service pointer 202 in the same way.

Second-Hand Updating of Resource Records in a Cache

Figure 4:
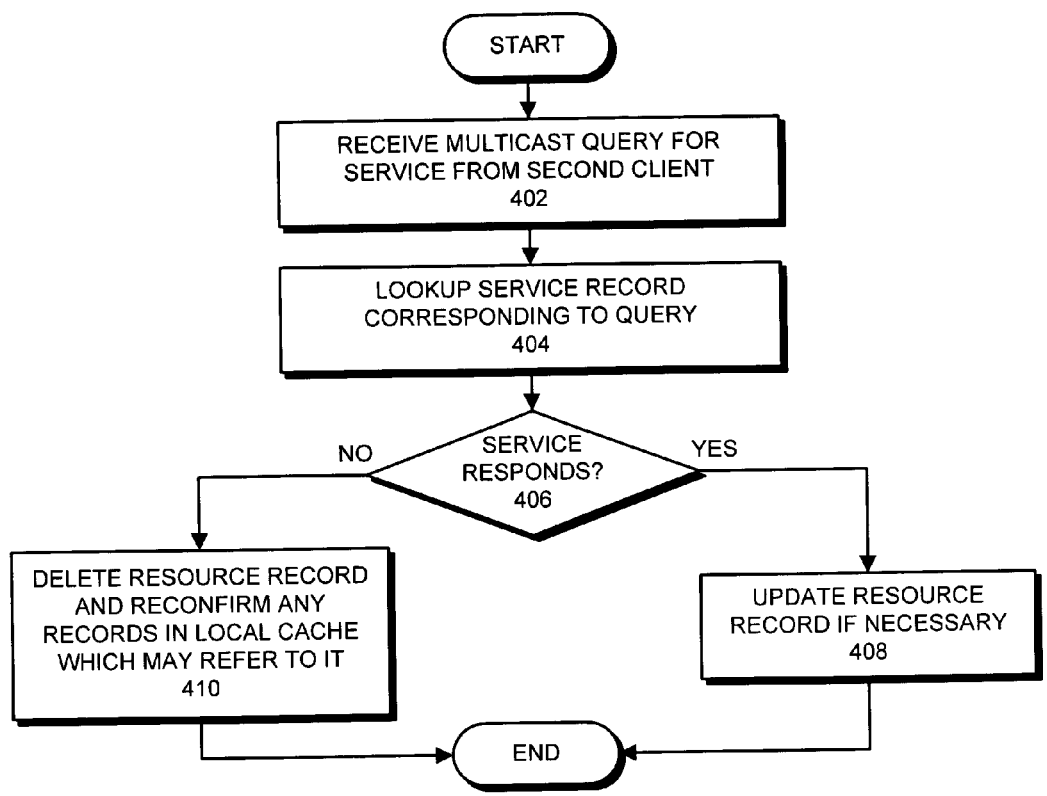
FIG. 4 presents a flowchart illustrating the process of updating a resource record in a cache in response to a query in accordance with an embodiment of the present invention.

FIG. 4 presents a flowchart illustrating the process of updating a resource record 202 in a local cache based on queries performed by other computer systems in accordance with an embodiment of the present invention. The system starts when computer system 102 receives a multicast message from computer system 104, wherein the multicast message queries a service provided by printer 106 (step 402). Computer system 102 looks in its local cache to locate service record 204 that corresponds to the query from computer system 104 (step 404). Next, computer system 102 waits for a response from the service (step 406). Note that in the present invention, devices and services respond to queries by sending a multicast message to network 100 rather than a unicast message directed only to the system that created the query. By sending a multicast response, this allows other devices on network 100 to update corresponding entries in their local caches without consuming extra bandwidth. If the service responds, computer system 102 updates corresponding resource records, such as address record 206 and service record 204, or creates new versions of address record 206 and service record 204, if necessary (step 408). If there is no response from the service, computer system 102 deletes service record 204 (step 410) as proceeds to reconfirm any records in the local cache which may refer to it.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for invalidating resource records in a local cache at a client computer system within a network, comprising:
   receiving a multicast message from another client querying a device;
   locating a resource record associated with the device;
   waiting for a multicast response from the device to the multicast message querying the device; and
   when a predetermined number of multicast messages from the other client querying the device have been received without receiving the multicast response from the device to the other client, invalidating the resource record associated with the device.

2. The method of claim 1, wherein the method further comprises:
   retrieving a resource record from the local cache at the client computer system;
   issuing one or more queries for the resource record at the client computer system;
   waiting for a response to the query at the client computer system; and
   if the response to the query is not received in a pre-determined amount of time and after issuing a predetermined number of queries for the resource record, invalidating the resource record at the client computer system.

3. The method of claim 2, wherein if the response to the issued query is not received in a pre-determined amount of time, the method further comprises:
   retrieving a parent record of the resource record at the client, wherein the parent record refers to the resource record;
   issuing a query for the parent record;
   receiving a response to the query from the device, wherein the response includes information for updating the resource record; and
   updating the resource record with the information received in the response.

4. The method of claim 3, wherein the method further comprises updating the parent record with the information received in the response.

5. The method of claim 2, wherein if the response to the issued query is not received in a pre-determined amount of time, the method further comprises:
   retrieving a parent record of the resource record at the client, wherein the parent record refers to the resource record;
   issuing a query for the parent record;
   waiting for a response to the query from the device; and
   if the response to the query is not received in a pre-determined amount of time, invalidating the parent record, and then repeating the above process by applying it recursively to any records that refer to the now-invalidated parent record.

6. The method of claim 2, wherein the resource records are retrieved and the queries are issued at a pre-specified time interval.

7. The method of claim 1 wherein invalidating the resource record further comprises invalidating a child resource record of the resource record.

8. A non-transitory computer-readable storage medium storing instructions that when executed by a computer cause the computer to perform a method for invalidating resource records in a local cache at a client computer system within a network, the method comprising:
   receiving a multicast message from another client querying a device;
   locating a resource record associated with the device;
   waiting for a multicast response to the multicast message querying the device; and
   when a predetermined number of multicast messages from the other client querying the device have been received without receiving the multicast response from the device to the other client, invalidating the resource record associated with the device.

9. The computer-readable storage medium of claim 8, wherein the method further comprises:
   retrieving a resource record from the local cache at the client;
   issuing one or more queries for the resource record;
   waiting for a response to the query; and
   if the response to the query is not received in a pre-determined amount of time and after issuing a predetermined number of queries for the resource record, invalidating the resource record at the client.

10. The computer-readable storage medium of claim 9, wherein if the response to the issued query is not received in a pre-determined amount of time, the method further comprises:
   retrieving a parent record of the resource record at the client, wherein the parent record refers to the resource record;
   issuing a query for the parent record;
   receiving a response to the query from the device, wherein the response includes information for updating the resource record; and
   updating the resource record with the information received in the response.

11. The computer-readable storage medium of claim 10, wherein the method further comprises updating the parent record with the information received in the response.

12. The computer-readable storage medium of claim 9, wherein if the response to the issued query is not received in a pre-determined amount of time, the method further comprises:
   retrieving a parent record of the resource record at the client, wherein the parent record refers to the resource record;
   issuing a query for the parent record;
   waiting for a response to the query from the device; and
   if the response to the query is not received in a pre-determined amount of time, invalidating the parent record, and then repeating the above process by applying it recursively to any records that refer to the now-invalidated parent record.

13. The computer-readable storage medium of claim 9, wherein the resource records are retrieved and the queries are issued at a pre-specified time interval.

14. The computer-readable storage medium of claim 8, wherein invalidating the resource record further comprises invalidating a child resource record of the resource record.

15. An apparatus that invalidates resource records in a local cache at a client computer system within a network, comprising:
    an invalidation mechanism configured to:
        receive a multicast message from another client querying a device;
        receive a resource record associated with the device from the retrieval mechanism in response to receiving the multicast message;
        wait for a multicast response to the multicast message querying the device; and
        when a predetermined number of multicast messages from the other client querying the device have been received without receiving the multicast response from the device to the other client, invalidate the resource record associated with the device.

16. The apparatus of claim 15, wherein the apparatus further comprises:
    a retrieval mechanism at the client configured to retrieve a resource record from the local cache at the client, wherein the invalidation mechanism is configured to:
        issue one or more queries for the resource record,
        wait for a response to the query, and
        if the response to the query is not received in a pre-determined amount of time and after issuing a predetermined number of queries for the resource record, invalidate the resource record at the client.

17. The apparatus of claim 16, further comprising an updating mechanism, wherein if the response to the issued query is not received in a pre-determined amount of time, the updating mechanism is configured to:
    retrieve a parent record of the resource record at the client, wherein the parent record refers to the resource record;
    issue a query for the parent record;
    receive a response to the query from the device, wherein the response includes information for updating the resource record; and to
    update the resource record with the information received in the response.

18. The apparatus of claim 17, wherein the updating mechanism is additionally configured to update the parent record with the information received in the response.

19. The apparatus of claim 16, wherein if the response to the issued query is not received in a pre-determined amount of time, the invalidation mechanism is additionally configured to:
    retrieve a parent record of the resource record at the client, wherein the parent record refers to the resource record;
    issue a query for the parent record;
    wait for a response to the query from the device; and
    if the response to the query is not received in a pre-determined amount of time, to invalidate the parent record, and to then repeat the above process by applying it recursively to any records that refer to the now-invalidated parent record.

20. The apparatus of claim 16, wherein the invalidation mechanism is configured to retrieve resource records and issue queries at a pre-specified time interval.

21. The apparatus of claim 15, wherein invalidating the resource record further comprises invalidating a child resource record of the resource record.

* * * * *